(No Model.)
A. NYLEN.
CALIPERS FOR FITTING WATCH CRYSTALS.
No. 421,138. Patented Feb. 11, 1890.
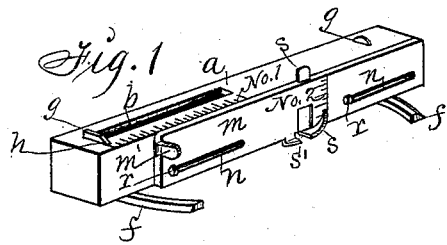
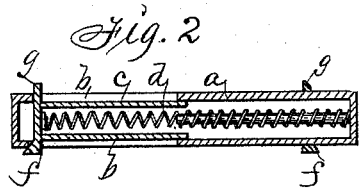
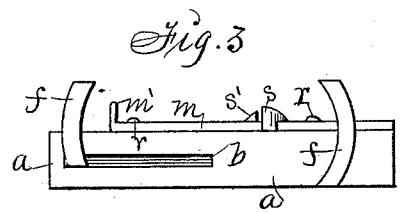
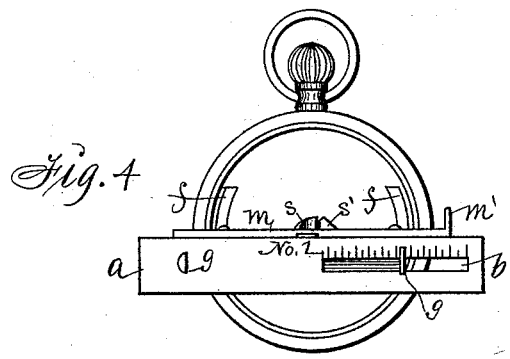
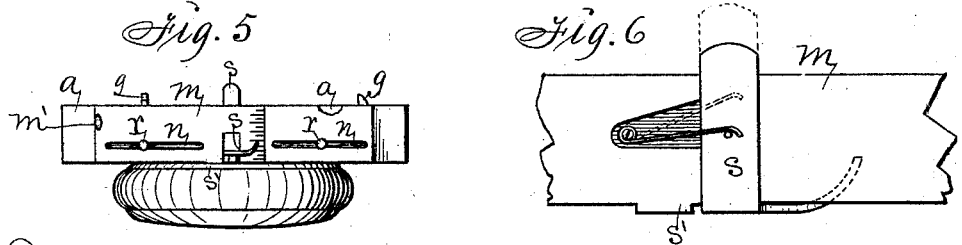
Witnesses:
O. U. Stiles
M. P. Smith
Inventor:
Andrew Nylen,
By Thomas G. Orwig, Att'y.

UNITED STATES PATENT OFFICE.

ANDREW NYLEN, OF DES MOINES, IOWA.

CALIPERS FOR FITTING WATCH-CRYSTALS.

SPECIFICATION forming part of Letters Patent No. 421,138, dated February 11, 1890.

Application filed October 12, 1888. Serial No. 287,967. (No model.)

*To all whom it may concern:*

Be it known that I, ANDREW NYLEN, a citizen of the United States of America, and a resident of Des Moines, in the county of Polk and State of Iowa, have invented Calipers for Fitting Watch-Glasses, of which the following is a specification.

My object is to save time and labor in selecting and fitting a glass of proper diameter and proper depth to a watch, and to prevent the annoyances and accidents incident to watch-makers in handling, measuring, and fixing glasses in the bezels of hinged cases.

My invention consists in the construction of calipers adapted to be placed upon a watch and adjusted relative to the bezel of the case that is to receive the glass in such a manner that the precise diameter of the glass required will be indicated by a pointer and scale, and also in such a manner that the dish or height of the glass at its center relative to the center-post and dial-pointers of the watch will be indicated by a pointer and scale.

Figure 1 of the accompanying drawings is an isometric view of my complete device. Fig. 2 is a longitudinal sectional view, and Fig. 3 a bottom view. Fig. 4 shows it applied to a watch as required to get the diameter of a glass; and Fig. 5 shows how the height of the glass is indicated at the same time by the pointer and scale at the side of the device, while the diameter is indicated by the pointer and scale on the top. Fig. 6 is an enlarged view of a section of a sliding plate that carries a pointer, and shows how the pointer is combined with the inside face of the plate and in a depression formed in the face of the plate.

*a* is a metal case about three inches long and five-sixteenths of an inch square. It is tubular and has closed ends.

*b b* are coinciding longitudinal slots in the top and bottom of the case.

*c* is a square tube fitted inside of the tube *a* in such a manner that it can slide longitudinally. It is shorter than the tube *a*, and a spring *d*, that engages the end of the case, will in its normal condition press the sliding tube *c* toward the opposite end.

*f f* are curved horizontal projections adapted to engage the bezel of a frame hinged to a watch-case, as shown in Figs. 4 and 5. One of these projections is fixed to the bottom of the case *a*, and the other is bent at right angles at one end and extends through the slot *b* of the case *a*, and is fastened to the bottom of the sliding tube *c* in such a manner that it will be carried by the sliding tube.

*g g* are vertical projections adapted to engage the edge of a watch-glass. One of them is fixed on top of the case *a* immediately over the horizontal projection *f* at the bottom, and the other is fixed to the sliding tube *c* above the curved horizontal projection fixed to the bottom of the sliding tube and extends upward through the slot *b* of the case *a*.

No. 1 is a scale formed on the top of the case *a* in such a manner that a pointer *h*, extending laterally from the projection *g*, will move relative to the frame to which a glass is to be fitted.

*m* is a sliding plate that has longitudinal slots *n n*, through which bearers *r* are passed and fastened to the side face of the case *a* in such a manner that the plate *m* will be retained against the outside of the case, but allowed longitudinal motion.

*m'* is a projection on the end of the plate, that serves as a handle for moving the plate.

No. 2 is a scale on the central portion of the plate.

*s* is a curved and spring-actuated pointer, fitted in a recess in the plate in such a manner that it will, when it comes in contact with the top of the center-post of a watch, as shown in Fig. 5, move upward relative to the scale No. 2 and indicate the height of a glass that will suit the watch. The under and convex side of the curved pointer is adapted to engage posts of different heights.

*s'* is a projection on the lower edge of the plate *m*, that will engage the side of the post of the watch and arrest the sliding motion of the plate.

In the practical use of my invention I place my calipers upon a watch, as illustrated by Figs. 4 and 5, by first compressing the spring *d* and then placing both projections *f* inside the bezel that is to receive the glass, and then allowing the spring to press them apart as far as they can separate within the frame. The pointer *h* will then indicate on the scale the diameter of the glass required.

To get the height of the glass, I move the sliding plate and slide the inclined bottom of the pointer s over the center-post of the watch, so that it will rise relative to the scale No. 2, and indicate thereon the height required in the center of the glass to prevent contact with the post. After the diameter and height of a glass are thus obtained without handling glasses the proper glass can then be selected from marked sizes and at once placed in the frame without delay.

I claim as my invention—

1. Calipers for fitting watch-glasses, comprising an oblong square metal case having coinciding longitudinal slots in its top and bottom, a fixed curved lateral projection on its bottom and a fixed vertical projection on its top and immediately over the lateral projection, a sliding tube actuated by a spring fitted inside of the case and provided with a fixed lateral projection at its bottom and a fixed vertical projection at its top, that extend through the slots in the case in the manner set forth, for the purposes stated.

2. The case a, having slots b, fixed projections f and g, and a scale No. 1 on its top side, and the sliding tube c, having corresponding projections f and g, extending downward from the bottom side of the case, constructed and combined substantially as shown and described, for the purposes stated.

3. The sliding plate m, having a scale No. 2 and carrying the curved pointer s, in combination with the case a, to operate in the manner set forth, for the purposes stated.

ANDREW NYLEN.

Witnesses:
M. P. SMITH,
THOMAS G. ORWIG.